US011310308B2

(12) United States Patent
Cadeau et al.

(10) Patent No.: US 11,310,308 B2
(45) Date of Patent: Apr. 19, 2022

(54) METHOD FOR MANAGING RESOURCES OF A COMPUTER CLUSTER BY MEANS OF HISTORICAL DATA

(71) Applicant: Bull SAS, Les-Clayes-sous-Bois (FR)

(72) Inventors: Thomas Cadeau, Massy (FR); Dineshkumar Rajagopal, Tamilnadu (IN)

(73) Assignee: BULL SAS, Les Clayes-sous-Bois (FR)

( * ) Notice: Subject to any disclaimer, the term of this patent is extended or adjusted under 35 U.S.C. 154(b) by 28 days.

(21) Appl. No.: 16/230,239

(22) Filed: Dec. 21, 2018

(65) Prior Publication Data
US 2019/0199788 A1 Jun. 27, 2019

(30) Foreign Application Priority Data

Dec. 22, 2017 (EP) .................................... 17210405

(51) Int. Cl.
*G06F 15/173* (2006.01)
*H04L 67/1008* (2022.01)
*G06F 9/50* (2006.01)
*H04L 41/0893* (2022.01)
*H04L 41/12* (2022.01)
*H04L 67/1034* (2022.01)

(52) U.S. Cl.
CPC ........ *H04L 67/1008* (2013.01); *G06F 9/5061* (2013.01); *H04L 41/0893* (2013.01); *H04L 41/12* (2013.01); *H04L 67/1034* (2013.01)

(58) Field of Classification Search
CPC . H04L 67/1008; H04L 67/1034; H04L 41/12; H04L 41/0893; G06F 9/5061

USPC ................ 709/224, 220, 223, 226; 718/104; 711/103, 162, 165
See application file for complete search history.

(56) References Cited

U.S. PATENT DOCUMENTS

| | | | | |
|---|---|---|---|---|
| 8,244,998 | B1* | 8/2012 | Krinke, II | G06F 11/1464 711/162 |
| 8,677,057 | B1* | 3/2014 | Cornwell | G06F 12/0246 711/103 |
| 9,541,979 | B2* | 1/2017 | Maupu | G06F 11/3447 |
| 9,870,269 | B1* | 1/2018 | Viswanathan | G06F 9/50 |
| 10,057,122 | B1* | 8/2018 | Andersen | G06F 9/5072 |
| 10,356,167 | B1* | 7/2019 | Dolas | H04L 67/1034 |
| 2005/0049833 | A1* | 3/2005 | Rossi | G01R 31/2846 702/182 |
| 2007/0180451 | A1* | 8/2007 | Ryan | G06F 9/5072 718/104 |

(Continued)

*Primary Examiner* — Thuong Nguyen
(74) *Attorney, Agent, or Firm* — Arc IP Law, PC; Joseph J. Mayo

(57) ABSTRACT

A method for managing resources of a computer cluster, wherein automated means allocate to a job at least one resource among several resources from the cluster, the automated means selecting the resource based on at least one historical data relative to previous uses of the resources and/or data relative to the arrangement, temperature, power consumption, bandwidth, or maintenance of the cluster or one or more components thereof, the automated mechanism thus determining the wear of the various resources available and choosing the resources with the lowest wear to perform the job, thereby avoiding the over-utilization of resources, one of the main causes of failures in a computer cluster, and increasing the lifetime of the cluster.

20 Claims, 2 Drawing Sheets

(56) References Cited

U.S. PATENT DOCUMENTS

| | | | |
|---|---|---|---|
| 2010/0058349 A1* | 3/2010 | Diwakar | G06F 9/5055 718/104 |
| 2010/0185805 A1* | 7/2010 | Chen | G11C 16/3495 711/103 |
| 2010/0250149 A1* | 9/2010 | Omori | G01R 31/2849 702/34 |
| 2012/0064879 A1 | 3/2012 | Panei | |
| 2013/0179356 A1* | 7/2013 | Pawlowski | F01D 21/00 705/305 |
| 2013/0290538 A1* | 10/2013 | Gmach | G06F 11/3457 709/226 |
| 2013/0290976 A1* | 10/2013 | Cherkasova | G06F 9/5038 718/104 |
| 2014/0040912 A1* | 2/2014 | Davidson | G06F 9/50 718/104 |
| 2014/0075222 A1 | 3/2014 | Jackson | |
| 2014/0173612 A1 | 6/2014 | Haydock et al. | |
| 2014/0261791 A1* | 9/2014 | Grabau | G05B 23/0283 137/551 |
| 2014/0343748 A1* | 11/2014 | Suzuki | G05B 15/02 700/300 |
| 2015/0033238 A1* | 1/2015 | Maupu | G06F 9/5088 718/104 |
| 2015/0074367 A1* | 3/2015 | Cher | G06F 11/3058 711/165 |
| 2015/0180719 A1* | 6/2015 | Wu | H04L 47/726 709/224 |
| 2015/0277987 A1* | 10/2015 | Di Balsamo | G06F 9/5083 718/104 |
| 2016/0043970 A1* | 2/2016 | Jacob | H04L 67/16 709/226 |
| 2016/0109919 A1* | 4/2016 | Maupu | G06F 1/32 713/340 |
| 2016/0246648 A1* | 8/2016 | Kamath | G06F 9/546 |
| 2016/0294728 A1* | 10/2016 | Jain | G06F 9/5077 |
| 2017/0004421 A1* | 1/2017 | Gatson | H04L 41/5038 |
| 2017/0054590 A1* | 2/2017 | Agarwal | H04L 67/1097 |
| 2017/0139738 A1* | 5/2017 | Kim | G06F 9/45558 |
| 2017/0199769 A1* | 7/2017 | Jain | G06F 9/5077 |
| 2017/0255493 A1* | 9/2017 | Cropper | G06F 9/505 |
| 2017/0351978 A1* | 12/2017 | Bellowe | G06Q 50/01 |
| 2018/0004570 A1* | 1/2018 | Maupu | G06F 9/5027 |
| 2018/0157915 A1* | 6/2018 | Sherry | H04N 21/84 |
| 2019/0042303 A1* | 2/2019 | Chen | H04L 67/1097 |
| 2019/0190743 A1* | 6/2019 | Vishnumolakala | H04L 41/147 |
| 2019/0199788 A1* | 6/2019 | Cadeau | H04L 41/12 |

\* cited by examiner

METHOD FOR MANAGING RESOURCES OF A COMPUTER CLUSTER BY MEANS OF HISTORICAL DATA

FIELD OF THE INVENTION

The invention deals with cluster computing. In particular, it deals with the management of resources in a computer cluster.

BACKGROUND OF THE INVENTION

It is known to provide a computer cluster with a resource and job management system. The role of the system is to allocate the resources of the cluster to the jobs that it has to handle. To manage both resources and jobs in order to optimize the use of the cluster, the system obtains information concerning the nodes of the cluster like its topography and which nodes are free to be used, and the descriptions of the jobs that the cluster has to handle like the number of central processing units needed to perform the job.

Yet, it is observed that such a system leads to an increase of failures of the resources of the cluster over the time, such that the availability of the service provided by the cluster may be discarded. Furthermore, such failures generate loss of time and important costs to replace components of the cluster.

SUMMARY OF THE INVENTION

One object of the invention is to increase the lifetime of a computer cluster, in particular the lifetime of the resources provided by the cluster.

For this purpose, it is provided according to the invention a method for managing resources of a computer cluster, wherein automated means allocate to a job at least one resource among several resources from the cluster, depending on at least one historical data relative to at least one previous use of the resources.

Thus, by studying data relative to previous uses of resources, the automated means determine the wear of the resources in order to choose the resource with the lowest wear to perform the job. Thus, thanks to these historical data, automated means avoid the over-utilization of resources, which is the main cause of failures in a computer cluster. The lifetime of the cluster is thus increased.

Preferably, automated means generate the historical data during the previous use and record the historical data in a database of historical data.

Thus, when a resource is selected to perform a task, this use and/or data relative to this use is registered in the database. When the system has to allocate a resource to a task, it thus knows to which extent the resource has been utilized for previous tasks, and thus how is its wear.

Advantageously, the historical data is relative to a use rate of a resource or to a log concerning a use of a resource.

Thus, the automated means may compute a use rate in order to compare the use rates of free resources before allocating a resource to a job. Furthermore, a log concerning a use of a resource may be reported after using this resource and may provide information to the automated means.

Preferably, the allocating step is further performed depending on a cluster topology.

Thus, the system takes the topology of the cluster into account in addition to the wear of the resources. Indeed, some topologies involve different allocating strategies, depending for example on the redundancy or links between the nodes of the cluster.

Advantageously, the allocating step is further performed depending on a predetermined resource management strategy.

Thus, an external user may select a resource management strategy or policy, which is taken into account by the automated means.

Preferably, the allocating step is further performed depending on at least one data relative to the job.

Thus, the data relative to the job may deal with several features, for example with a number of tasks to perform the job, a number of central processing units or a quantity of memory or bandwidth needed, and/or a number of nodes needed.

Advantageously a sensor situated in the cluster obtains a data and transmits the data to the automated means, the allocating step being further performed depending on the data.

Preferably, the data relates to a temperature of the cluster.

Thus, if a component is too hot, the system may choose to allocate another component to the job in order to avoid overheating the component.

Advantageously, the allocating step is further performed depending on at least one data relative to a maintenance of the cluster.

Thus, a user may register the date of the last maintenance of a resource. The system may take this date into account to limit the number of uses of this resource if the date is ancient, and may allocate recently maintained resources to the job as the risk of failure is lower when a maintenance is recent.

Preferably, automated means determine relative ages of at least two components of the cluster depending on at least one of the data recited above.

Thus, with data obtained by the system, this latter may determine the wear and thus the relative ages of components of the cluster when compared to each other. By "relative ages", we mean that the goal is to compare the ages of components in respect with each other, not necessary the absolute age of a component. An age could be related to several values like a number of cycles of a component, a duration since implementation in the cluster, or a duration of active utilization of a resource. Furthermore, it is also possible to compute an absolute age, that is to say the age of a component without comparing it to other components.

Advantageously, automated means determine a conclusion concerning the relative ages of the components and emit a message comprising this conclusion.

Thus, a message to an external user may be sent.

Preferably, the conclusion is relative to a workload of the cluster, to a maintenance date of the cluster, to a temperature of the cluster, to a power consumption of the cluster, and/or to a bandwidth of the cluster.

Thus, the message may warm a user that the computed age of the resource/component is due to one of these indications.

Advantageously, by means of at least one of the data recited above, automated means determine at least one action to be taken in order to improve the management of the resources of the cluster.

Thus, the system suggests an action to an external user who may decide to take it or not. Or the system may be configured to take it itself automatically.

Preferably, the automated means further determine the action by means of at least one data relative to at least one effect of at least one action previously taken.

Thus, taken actions generate effects which may be registered in a database in order to be studied by automated means or by an external user. The efficiency of the action may thus be measured in order to select it later again or not.

Advantageously, the action to be taken is relative to shutting down a component of the cluster, substituting a component of the cluster and/or sending a message.

Preferably, the method according to the invention is implemented as part of a high performance computing method.

Indeed, high performance computing needs one or several computer clusters with an optimized management of the resources and a maximal lifetime in order to be efficient.

According to the invention, it is also provided a computer program, comprising code instructions able to control the implementation of steps of a method recited above when executed on a computer.

According to the invention, it is also provided a method for making the program of the preceding claim available for downloading over a telecommunications network.

According to the invention, it is also provided a device for managing resources of a computer cluster, configured to allocate to a job at least one resource among several resources of the cluster depending on at least one historical data relative to at least one previous use of the resources.

Preferably, the resource is a node, a server, a bandwidth, a power, a memory such as a ram or a flash memory, or a component such as a processor, a connector or a data storage medium.

According to the invention, it is also provided a system comprising a device according to the invention and a computer cluster.

According to the invention, it is also provided a database including an electronic support comprising, in registered form, at least one historical data relative to at least one use of at least one resource of a computer cluster.

Other objects of the present invention and its particular features and advantages will become more apparent from consideration of the following drawings and detailed description of the invention.

DETAILED DESCRIPTION OF THE INVENTION

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

Figure 1:
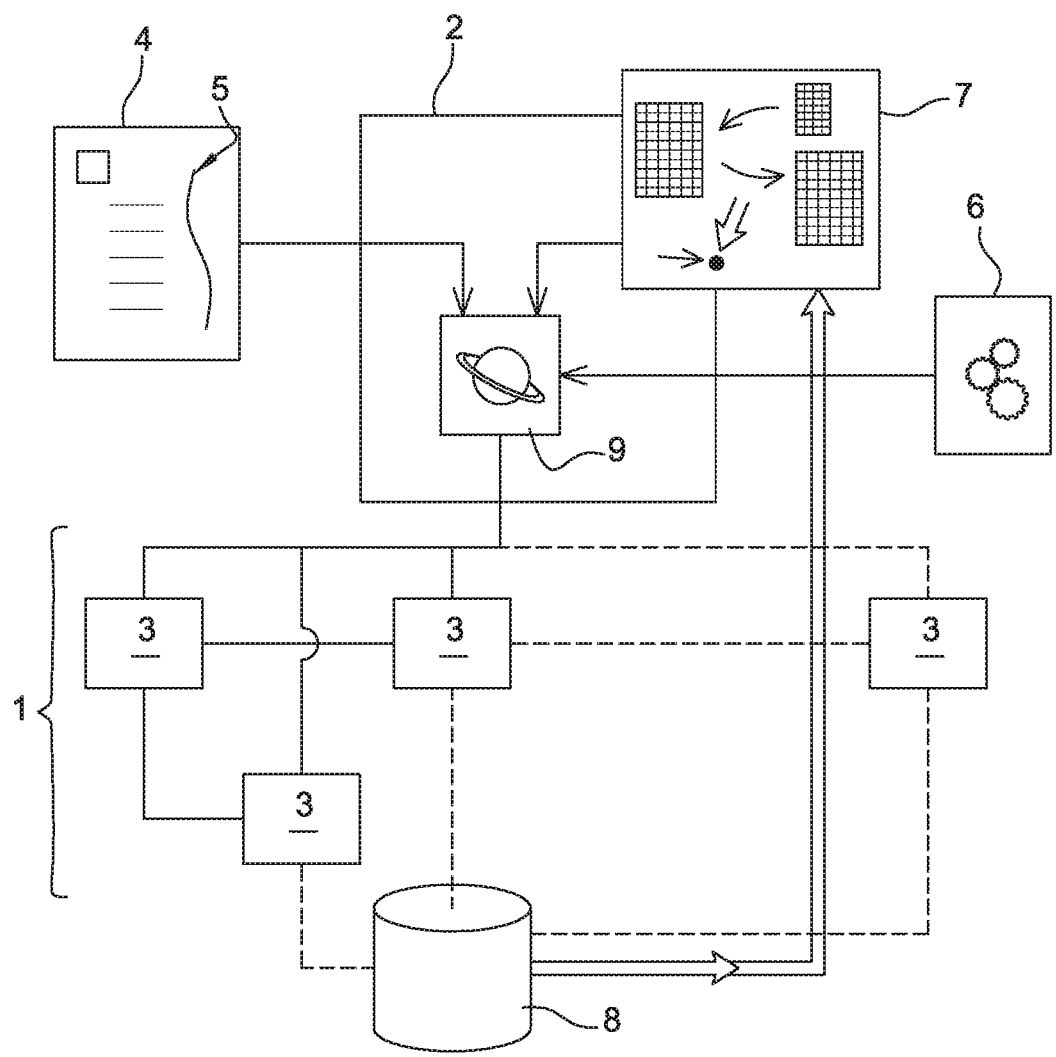
FIG. 1 depicts a schematic representation of a system according to exemplary embodiments of the present invention.

As illustrated on FIG. 1, a system according to the invention comprises at least a computer cluster 1 and a device 2 for managing resources of this cluster. A computer cluster is, as generally defined, an assembly of several servers whose resources are combined to behave like one single installation, in order to increase the speed of computing by parallel computing and allocating tasks to adapted resources. The computer cluster 1 includes several servers 3 arranged according to a predetermined topology. Here, four servers are illustrated, some of them being directly linked, other being indirectly linked.

In a computer server, one server corresponds to one node, which is a term known from a skilled person. But one node may also be considered as a part of a server or as several servers arranged together. In this description, for a better understanding, one node corresponds to one server 3.

A server 3 comprises at least one resource which may be used by the cluster 1. It could be any resource that a computer includes, like any type of memory, such that a flash memory or a volatile memory via any data storage medium such as a hard disk, a bandwidth, a power of computing via processors such as central processor units, connectors to connect components between them. Even a server or node itself may be considered as a resource. To be more general, in this invention, any component or capacity, known by a skilled person as a resource of any computer cluster, is considered as a resource of the computer cluster 1. Thus, all servers 3 are or comprise one or several of these resources, and each server 3 could comprise resources different from each other.

The computer server 1 is connected to the resource and job management device 2. Alternatively, this device 2 could also be considered as a part of the computer cluster 1.

This device 2 comprises automated means to receive external data and to provide decisions. The type of these automated means will be deduced by the skilled person and could be for examples server, connections, databases or processors. A member of this device is the decisional unit 9 that comprises processors and emits the decisions depending on all received data. In other terms, this entity makes the resource selection. The decisions are to allocate the resources of the cluster 1 to the jobs to be executed. Indeed, when a cluster 1 has to perform an important computing, this computing is divided between jobs, wherein jobs may be themselves divided between tasks. The device 2 obtains here the knowledge of the resources that are needed to perform the job 4. How these information are obtained is not concerned by the invention and is fully known by a skilled person. The description 5 of the job 4 includes several factors like the number of processors needed, the extent of the bandwidth needed, the total of nodes 3 needed, and could include any type of any other resource needed to perform the job 4. Then, the device 2 has to allocate the resources of the cluster 1 to the job 4. This part will be described later.

The device 2 also obtains data of configuration from a table 6. These data include the type of management strategy determined for example by an external user. Indeed, such a user may decide to prioritize some resources with respect to other resources and thus could select a specific strategy among several suggested strategies. The table 6 also includes data relative to the topography of the cluster 1. Indeed, depending on the topography, the resources are more or less closed to each other, redundancy of components is more or less present and thus allocating the resources to the job 4 may vary depending on these factors. This table 6 may also contain other data relative to the configuration of the cluster 1, like the type of queue and all data relative to the configuration that are obvious for a skilled person.

The device 2 also obtains data from a predictive engine 7. This engine is a device that gathers historical data and deduces from them factors to be taken into account by the system 2 when allocating the resources to the jobs. In this embodiment, the predictive engine 7 thus obtains historical data from a database 8, these data being related to the use of resources of the cluster 1. Thus, the predictive engine gathers these historical data relative to previous use and computes data relative to the wear of the resources concerned by the historical data. Indeed, by knowing which resource has been used, how many time, to which extent and during which duration, the predictive engine 7 may compute the wear and thus an age of the resource, and compare the ages of all the resources of the cluster. These ages, also called relative ages, or wear, are thus utilized by the device 2 as a supplementary factor to be taken into account when allocating the resources to jobs and tasks. It helps avoiding overutilization of some resources and thus it allows to decrease the number of failures of resources.

Finally, in this embodiment, the nodes 3 of the cluster 1 are linked to the database 8 of historical database. Thus, when the nodes comprise resources that are used to perform a job/task, the nodes or the resources may make reports, or logs concerning their use. These reports or logs could comprise a variety of data, from a single indication that the resource has been used to a detailed report of the use with problems encountered, number of cycles, durations, etc. These data could also refer to statistics like a use rate of a resource. These historical data are then computed by the predictive engine 7 and used by the device 2 to allocate the resources in order to optimise the selection of resources and thus to increase the lifetime of the resources and of the cluster 1.

To finish, it has to be noted that the cluster 1 and its related devices such as device 2 are advantageously a part of a supercomputer to make high performance computing. Indeed, such type of computing particularly needs a cluster with a good lifetime and an efficient management of its resources as high performance computing is very consumptive and wearing.

We are now going to introduce a description of a method according to the invention with reference to the embodiment illustrated on FIG. 1.

The cluster 1 is tasked with computing high calculation. To perform this calculation, the job 4 needs some nodes 3 to be executed, these nodes providing resources asked by the descriptions 5 of the job 4. To select the resources and thus the nodes to perform the job 4, device 2 takes into account the table 6 with configuration data, and the historical data of the database 8.

Thus, the device 2 determines which are the nodes 3 that are free. Indeed, some nodes may be already taken to perform other calculations. Then, among these free nodes, the predictive engine 7 reports the ages of each nodes that have been computed thanks to the historical data. Device 2, thanks to its decisional unit 9, then allocates the youngest nodes 3 to perform the jobs 4.

To conclude, nodes 3 perform the jobs or tasks and report data relative to the use of their resources into the database 8.

Predictive engine 7 uses these historical data to update the age of the resources of cluster 1, in order to allow the device 2 to allocate the updated youngest nodes for the next calculation.

It has to be noted that, depending on the configuration and choices of a user, the device 2 may chose resources that are not necessarily the youngest. Indeed, the configuration in table 6 could ask the device 2 to weight the ages of the predictive engine 7 in order to take them into account less or more than other factors.

Furthermore, the configuration may allow the device 2 to deallocate resources to make them available to new jobs. Thus, all the ages of the resources may be compared, whether they are free or not.

To sum-up, the use of historical data thus allows to compute ages of the resources in order to avoid overutilization of the resources when allocating them to jobs.

Figure 2:
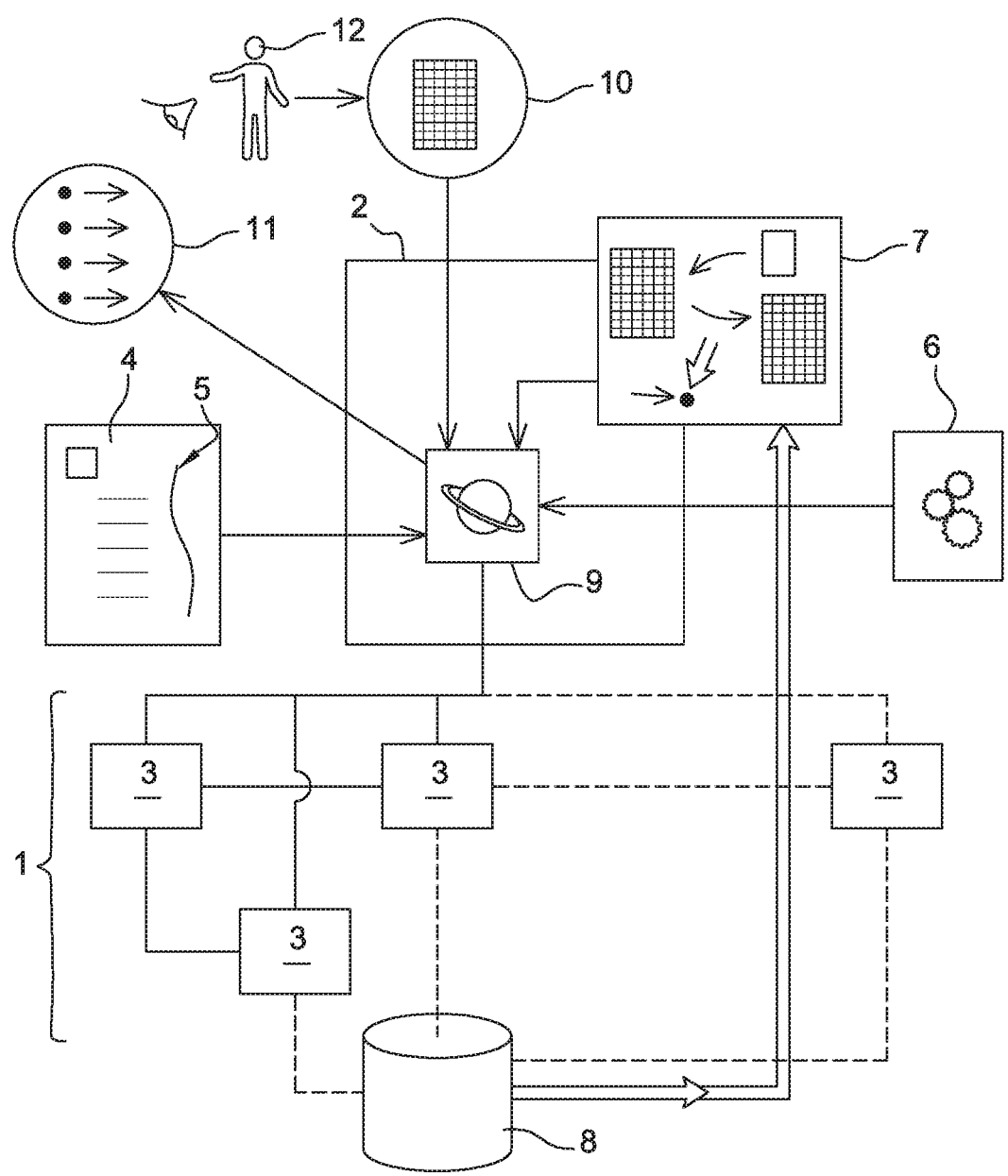
FIG. 2 depicts a further schematic representation of the system according to the exemplary embodiments of the present invention depicted in FIG. 1.

Referring next to FIG. 2, the depicted embodiment of the present invention comprises the same component as the embodiment of FIG. 1. In particular, the topology of the cluster 1 is the same, the predictive engine 7 plays the same role, and the historical data of the database 8 are updated as described above.

The difference in respect with the first embodiment is the presence of two new entities: the external interface 10 and the table of messages 11.

The external interface 10 allows a user 12 to enter other data, like the date of maintenance of the cluster 1, or the date of maintenance of one of the components or resources of the cluster 1. Connected to the device 2, this latter may thus determine the last date of maintenance of each resource and use this factor when allocating the resources to the jobs to be executed. This interface 10 may also allow the user to enter other types of administrative data, which he may consult or which could be used by the device 2 when allocating the resources. This interface 10 may be viewed and implemented simply as a table 6 with supplementary data registered.

The table of messages 11 allows the device 2 to send messages to an external user 12. It may send all messages or information that the user wishes to know about the system, and it particularly allows to explain to the user the ages of the resources that have been computed. Thus, device 2 could determine a main reason for the age of the resource, like an important workload of some resources of the cluster, a maintenance date of the cluster that would be ancient, a temperature of a component that would be hot, or an important power consumption of a component. It may also relate to a bandwidth of a component of the cluster, like a lack of bandwidth or debit. The user 12 is thus aware of the state of each resource of its cluster 1. It may allow him to efficiently decide of a different configuration data to enter or to use another cluster if necessary. For this purpose, it is clear that in this embodiment, the cluster 1 comprises sensors and/or analyse tools, like a temperature sensor situated in a specific component or part of a server 3 or of the cluster 1, or in each server 3 or several servers if necessary.

The table of messages 11 also allows to suggest actions to the user. Indeed, in this embodiment, the device 2 may deduce from the computed relative ages actions that could be taken to improve the efficiency of the cluster 1. For example, these actions may be to shut down a component of the cluster 1, substitute a component of the cluster and/or sending a message to the system, for example to change a parameter of the configuration via the table 6 or the interface 10. This message may also be an e-mail or a sms alert to be sent to other systems.

If the external user 12 decides to execute an action that the device 2 suggested via the table 11, the effect of its action is analyzed by the device 2. For example, if the user decides to replace a processor unit of a server 3 by another, the effect of this change may be considered, for example via the historical data when the resource is used. If the historical data concerning this resource makes it clear, via a log or report, that less problems are encountered when the resource is used in a job, the device 2 deduces that the replacement of the resource was efficient.

This effect may be reported to the user. Above all, this effect is registered by the device 2, in any database, such that if a problem similar to the problem encountered and solved by this action appears, the device 2 will suggest the same action to the user 12.

Furthermore, the device may be configured to execute itself any action that it determined, such that shutting down a component or change a parameter in a configuration of a component of the cluster 1.

The steps of a method to be performed on this embodiment are the same as the steps described above in respect with the first embodiment. But for this embodiment, as explained, the decision unit 9 decides the allocation of resources with other factors, in addition to the age of the resources computed by predictive engine 7.

To sum up, we introduced here a method for managing resources of a computer cluster 1, wherein automated means, in this case a device 2 comprising a unit 9 and with the help of others devices, allocate to a job 4 at least one resource among several resources from the cluster 1, depending on at least one historical data 8 relative to at least one previous use of the resources. This method allows to increase the lifetime of the cluster by avoiding the overutilization of resources.

Among other possible data, in addition to historical data, to be considered by the automated means when executed, we may refer to:
 a cluster topology,
 a determined resource management strategy for example selected by an user,
 a data relative to the job 4 to be executed, like the type of resources that the job needs,
 a data obtained from at least one sensor situated in the cluster 1, for example a temperature sensor in a processor of a server 3, the data being transmitted to the automated means,
 a data relative to a maintenance of the cluster.

At least with the historical data, the device is able to compute an age of a resource and to select resources to be allocated depending on their age.

The invention is not limited to the embodiments presented and other embodiments will become apparent to those skilled in the art.

It is especially possible to combine the two described and illustrated embodiments. Thus, the device 2 could combine the factors of the historical data and of the interface 10 only to allocating the resources, or to add other data, depending on the presence or not of different sensors in the cluster or on data registered by the user, for example.

Furthermore, it is possible to imagine other types of data to help the device 2 with allocating the resources to the jobs, in order to improve again the lifetime of the cluster.

While the present invention has been described with reference to particular embodiments and arrangements of parts, features, and the like, it is not limited to these embodiments or arrangements. Indeed, modifications and variations will be ascertainable to those of skill in the art, all of which are inferentially and inherently included in these teachings.

What is claimed is:

1. A method for managing resources of a computer cluster, comprising:
 via a computer, allocating a job at least one resource from the computer cluster among several resources from the computer cluster;
 wherein the allocating is performed by the computer depending on
  at least one historical data related to at least one previous use of the several resources, wherein said at least one historical data including at least one of data relative to said job and data relative to an arrangement, temperature, power consumption, bandwidth, a log concerning use of a resource, of the computer cluster or one or more components thereof;
  at least one data relative to a wear of said at least one resource of the computer cluster, wherein wear data is computed from a maintenance date and the at least one historical data, wherein said maintenance date is a date of last maintenance of the computer or one or more components thereof;
  a cluster topology of the computer cluster;
  a predetermined resource management strategy selected by an external user for use by the computer;
 wherein said at least one resource is allocated to said job when said at least one resource
  comprises a lowest use rate, determined from the at least one historical data,
  comprises a lowest wear, determined from the at least one data relative to a wear of said at least one resource of the computer cluster,
  is most suited regarding the cluster topology,
  is compatible with the predetermined resource management strategy.

2. The method according to claim 1, wherein the computer generates the at least one historical data during a previous use and records the at least one historical data in a database of historical data.

3. The method according to claim 1, wherein the allocating is further dependent on at least one data relative to a maintenance of the computer cluster.

4. The method according to claim 1, wherein the computer determines at least one action to be taken in order to improve management of the resources of the computer cluster based on one or more of said at least one historical data, said data relative to said job, and said data relative to the arrangement, said temperature, said power consumption, said bandwidth, or said maintenance of the computer cluster or said one or more components thereof.

5. The method according to claim 4, wherein the computer further determines the at least one action by means of at least one data relative to at least one effect of at least one action previously taken.

6. The method according to claim 4, wherein the at least one action to be taken is relative to shutting down a component of the computer cluster, substituting a component of the computer cluster, or sending a message.

7. The method according to claim 1, implemented as part of a high-performance computing method.

8. The method according to claim 1, wherein a sensor situated in the computer obtains said data and transmits the data to the computer, the allocating further performed depending on the data.

9. The method according to claim 1, wherein the predetermined resource management strategy comprises prioritizing said at least one resource over other resources.

10. A method for managing resources of a computer cluster, comprising:
 providing a sensor situated in the computer cluster that obtains data and transmits the data to a computer;

via the computer, allocating to a job at least one resource from the computer cluster among several resources from the computer cluster;
wherein the allocating is performed by the computer depending on
at least one historical data related to at least one previous use of the several resources, said at least one historical data including at least one of data relative to said job and data relative to an arrangement, temperature, power consumption, bandwidth, a log concerning use of a resource, or maintenance of the computer cluster or one or more components thereof;
at least one data relative to a wear of said at least one resource of the computer cluster, wherein wear data is computed from a maintenance date and the at least one historical data, wherein said maintenance date is a date of last maintenance of the computer or one or more components thereof;
a cluster topology of the computer cluster;
the data obtained from the sensor;
wherein said at least one resource is allocated to said job when said at least one resource
comprises a lowest use rate, determined from the at least one historical data,
comprises a lowest wear, determined from the at least one data relative to a wear of said at least one resource of the computer cluster,
is most suited regarding the cluster topology,
is compatible with a predetermined resource management strategy.

11. The method according to claim 10, wherein the data relates to a temperature of the computer and wherein the at least one resource is further allocated to said job when said at least one resource comprises a lowest temperature.

12. A method for managing resources of a computer cluster, comprising:
via a computer, allocating to a job at least one resource from the computer cluster among several resources from the computer cluster;
the allocating is performed by the computer depending on
at least one historical data related to at least one previous use of the several resources, said at least one historical data including at least one of data relative to said job and data relative to an arrangement, temperature, power consumption, bandwidth, a log concerning use of a resource, of the computer cluster or one or more components thereof;
at least one data relative to a wear of said at least one resource of the computer cluster, wherein wear data is computed from a maintenance date and the at least one historical data, wherein said maintenance date is a date of last maintenance of the computer or one or more components thereof;
a cluster topology of the computer cluster;
wherein the computer determines relative ages of at least two components of the computer cluster based on the at least one historical data;
wherein said at least one resource is allocated to said job when said at least one resource
comprises a lowest use rate, determined from the at least one historical data,
comprises a lowest wear, determined from the at least one data relative to a wear of said at least one resource of the computer cluster,
is most suited regarding the cluster topology,
is compatible with a predetermined resource management strategy,
is younger than at least one other resource.

13. The method according to claim 12, wherein the computer determines a conclusion concerning the relative ages of the at least two components and emits a message comprising the conclusion.

14. The method according to claim 13, wherein, the conclusion is relative to one of a workload of the computer cluster, a maintenance date of the computer cluster, the temperature of the computer cluster, the power consumption of the computer cluster, and the bandwidth of the computer cluster.

15. A non-transitory computer readable program for managing resources of a computer cluster, comprising:
code instructions executing on a computer for allocating to a job at least one resource from the computer cluster among several resources from the computer cluster, depending on
at least one historical data related to at least one previous use of the several resources,
at least one data relative to a wear of said at least one resource of the computer cluster, wherein wear data is computed from a maintenance date and the at least one historical data, wherein said maintenance date is a date of last maintenance of the computer or one or more components thereof,
a cluster topology of the computer cluster, and
a predetermined resource management strategy by and external user of use by the computer, wherein the predetermined resource management strategy comprises prioritizing said at least one resource over other resources,
wherein said at least one resource is allocated to said job when said at least one resource
comprises a lowest use rate, determined from the at least one historical data,
comprises a lowest wear, determined from the at least one data relative to a wear of said at least one resource of the computer cluster,
is most suited regarding the cluster topology,
is compatible with the predetermined resource management strategy.

16. The non-transitory computer readable program of claim 15, wherein the non-transitory computer readable program is available for downloading over a telecommunications network.

17. A non-transitory computer readable medium comprising program instructions executed on a computer for managing resources of a computer cluster, the computer being configured to allocate to a job at least one resource among several resources of the computer cluster depending on
at least one historical data related to at least one previous use of the several resources, and
a cluster topology of the computer cluster as determined by the computer wherein the computer determines relative ages of at least two components of the computer cluster based on a maintenance date and said at least one historical data,
said at least one historical data including at least one of data relative to said job and data relative an arrangement, temperature, power consumption bandwidth, of the computer cluster or one or more components thereof, and
wherein the maintenance date is a date of last maintenance of the computer cluster or one or more component thereof, wherein said at least one resource is allocated to said job when said at least one resource
- comprises a lowest use rate, determined from the at least one historical data,
- comprises a lowest wear, determined from at least one data relative to a wear of said at least one resource of the computer cluster,
- is most suited regarding the cluster topology,
- is compatible with a predetermined resource management strategy.

18. The non-transitory computer readable medium according to claim 17, wherein the at least one resource is a node, a server, a bandwidth, a power, a memory such as a ram or a flash memory, or a component such as a processor, connector or a data storage medium.

19. A system for managing resources of a computer cluster, the system comprising:
- a non-transitory computer readable medium comprising program instructions executed on a computer and further comprising said computer cluster, the computer being configured to allocate to a job at least one resource among several resources of the computer cluster depending on
  - at least one historical data related to at least one previous use of the several resources,
  - a cluster topology of the computer cluster as determined by the computer,
  - wherein the computer determines relative ages of at least two components of the computer cluster based on a maintenance date and said at least one historical data,
    - said at least one historical data including at least one of data relative to said job and data relative an arrangement, temperature, power consumption bandwidth, of the computer cluster or one or more components thereof, and
    - wherein the maintenance date is a date of last maintenance of the computer cluster or one or more component thereof,
- wherein said at least one resource is allocated to said job when said at least one resource
  - comprises a lowest use rate, determined from the at least one historical data,
  - comprises a lowest wear, determined from at least one data relative to a wear of said at least one resource of the computer cluster,
  - is most suited regarding the cluster topology,
  - is compatible with a predetermined resource management strategy.

20. The system according to claim 19 further comprising a database including an electronical support comprising, in registered form, said at least one historical data relative to at least one use of said at least one resource of said computer cluster.

* * * * *